United States Patent [19]
Lermann et al.

[11] 3,988,747
[45] Oct. 26, 1976

[54] AUTOMATIC FOCUSSING SYSTEM FOR PHOTOGRAPHIC CAMERAS

[75] Inventors: Peter Lermann, Narring; Stefan Vogt; Alois Rieder, both of Munich, all of Germany

[73] Assignee: AGFA-Gevaert, A.G., Leverkusen, Germany

[22] Filed: Feb. 28, 1975

[21] Appl. No.: 554,318

[30] Foreign Application Priority Data
  Mar. 6, 1974  Germany............................ 2410681

[52] U.S. Cl................................. 354/25; 250/204; 354/31; 354/195
[51] Int. Cl.² ........................................ G03B 7/08
[58] Field of Search....................... 354/25, 31, 195; 250/201, 204, 235

[56] References Cited
UNITED STATES PATENTS
| | | | |
|---|---|---|---|
| 3,610,934 | 10/1971 | Turner | 250/201 |
| 3,860,935 | 1/1975 | Stauffer | 250/204 X |
| 3,937,950 | 2/1976 | Hosoe et al. | 354/25 |

OTHER PUBLICATIONS
Frosch et al., IBM Technical Disclosure Bulletin, vol. 15, No. 2, p. 504, July 1972.

Primary Examiner—L. T. Hix
Assistant Examiner—J. A. LaBarre
Attorney, Agent, or Firm—Michael J. Striker

[57] ABSTRACT

A prism positioned behind the objective rotates at a predetermined frequency. The pulsed light beam produced thereby is split into a first and second pulsed beam, each falling on a photoelectric transducer element. The first photoelectric transducer element is positioned at a distance from the objective which is less than the distance between the film plane and the objective plane by a predetermined distance. The second photoelectric transducer is positioned away from the objective by a distance exceeding the distance between the film plane and the objective plane by the same predetermined distance. The first and second electrical signals produced by the first and second photoelectric transducer are differentiated and stored. The so-stored signals are compared and a control signal for driving a motor in a first or second direction is furnished corresponding to the difference therebetween. The motor drives the objective either closer to or away from the film plane in response to the control signal.

13 Claims, 2 Drawing Figures

3,988,747

AUTOMATIC FOCUSSING SYSTEM FOR PHOTOGRAPHIC CAMERAS

BACKGROUND OF THE INVENTION

The present invention relates to automatic focussing arrangements for photographic cameras which include both still cameras and moving picture cameras. In particular, such cameras having an objective which can be moved along a predetermined path between a first and second extreme position corresponding to a close and a far object to be photographed. Such cameras also have moving means which move the objective in response to a control signal into a position such that a sharp image of the object to be photographed will be projected onto the film plane.

SUMMARY OF THE INVENTION

It is an object of the present invention to furnish an automatic focussing arrangement which will automatically correctly focus the camera in response to sighting of a high-contrast object.

In accordance with the present invention, beam splitting means are furnished which divide the light after passing through the objective into a first and second light beam. Photoelectric transducing means are positioned in the path of the first and second light beam. The distance between the first photoelectric transducing means and the objective plane is less by a predetermined distance than the distance between the film plane and the objective plane. The distance of the second photoelectric transducing means from the objective plane is equal to the distance between the film plane and the objective plane increased by said predetermined distance increment. Each of the photoelectric transducing means has a differentiating circuit connected thereto. Storage means are connected to the output of each of the differentiating circuits. A comparator circuit is connected to each of the storage means and furnishes a control signal to moving means which move the objective in correspondence to the control signal. If the objective is not correctly positioned, the two signals stored in the storage means have a different amplitude so that the difference therebetween causes the correct control signal to be applied to the moving means, which, in a preferred embodiment of the present invention comprise an electrically controlled motor. If the objective is correctly positioned, the image received by the two photoelectric transducing means has an equal lack of sharpness, so that the differentiated signals stored in the storage means have equal amplitudes. The difference between the two stored signals thus is zero causing no control signal to be applied to the moving means for moving the objective.

In a preferred embodiment of the present invention each of the photoelectric transducer means receives light corresponding to the same portion of the object to be photographed.

In a preferred embodiment of the present invention each of the light beams is a pulsed light beam and each of the storage means is discharged at a predetermined time relative to the furnishing of the pulses in said pulsed light beam.

In a further preferred embodiment of the present invention disconnect means are furnished for connecting the storage means to the photoelectric transducing means only during predetermined short time intervals during the time said photoelectric transducing means receive light. Thus the control circuit responds only to a small portion of the object being scanned, thereby decreasing the possibility of incorrect positioning of the objective. The possibility that the storage means stores spurious pulses is also decreased.

In a further preferred embodiment of the present invention, an amplifier with automatic gain control is provided between the photoelectric transducing means and the associated differentiating circuit. The gain of the amplifier is varied by means of a photosensitive element positioned to receive ambient light in such a way that the gain varies inversely with such ambient light. Thus automatic focussing can take place even under poor ambient light conditions.

In a further preferred embodiment of the present invention optical scanning means including a rotating prism are furnished which project light onto the first and second photoelectric transducing means. The charging and discharging of the storage means, which in a preferred embodiment of the present invention are capacitors, takes place in synchronism with the operation of the optical scanning means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
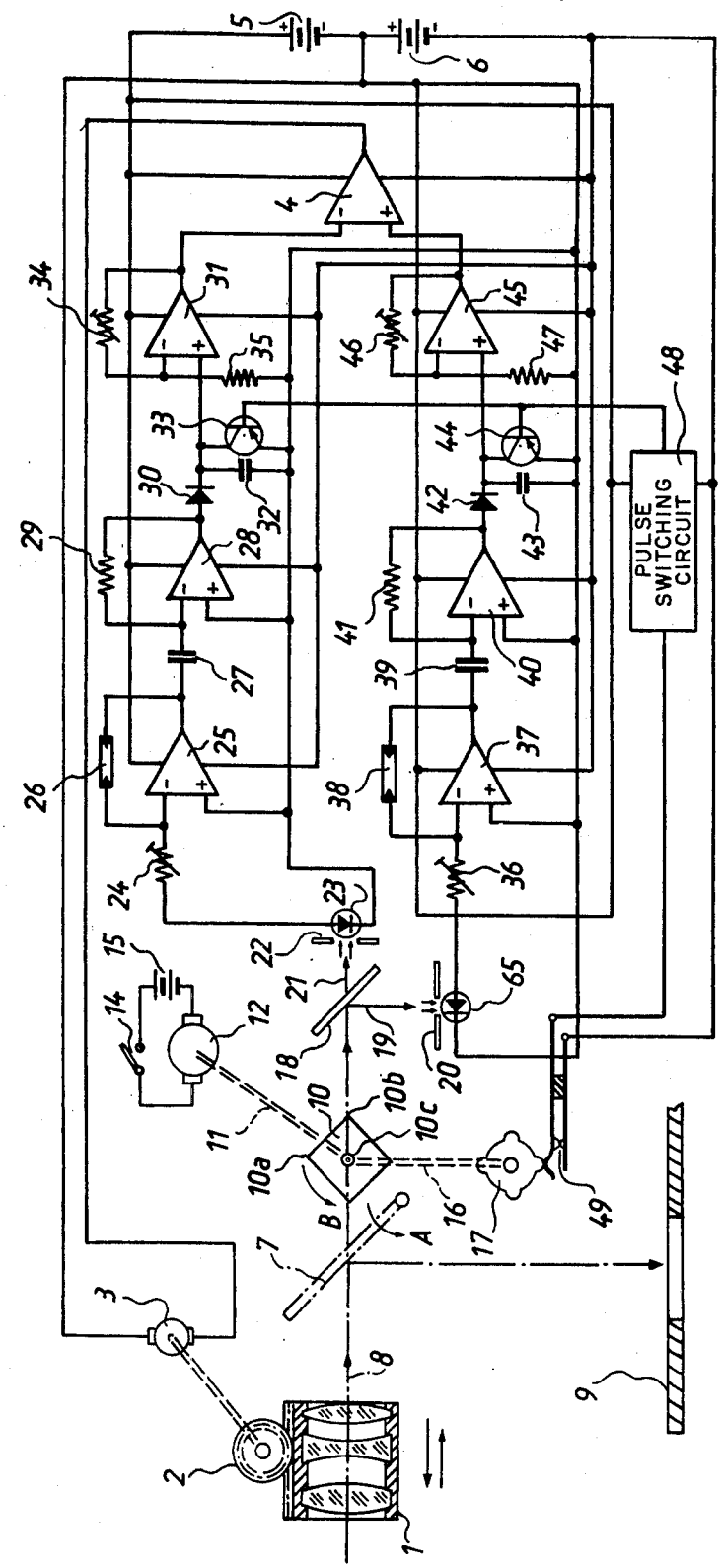
FIG. 1 is a first embodiment of the present invention.

A preferred embodiment of the present invention will now be described with reference to the drawing.

In FIG. 1 the objective which is movable between a first and second extreme position is denoted by reference numeral 1. The moving means for moving the objective along a predetermined path between said first and second extreme position are denoted by reference numeral 2 and reference numeral 3, reference numeral 3 referring to a DC motor while reference numeral 2 refers to the gearing associated therewith. Motor 3 is connected in the output circuit of a differential amplifier 4 which is one embodiment of comparator means. The other terminal of DC motor 3 is connected at the common point of two batteries 5 and 6.

Positioned behind objective 1 in the direction of propagation of light is a rotatable mirror 7 which, in the position shown, projects light travelling along a path 8 onto the film plane 9. When mirror 7 is rotated in the direction of arrow A, the optical beam 8 can fall on a rotating prism 10. Prism 10 rotates in the direction indicated by arrow B. Prism 10 is mechanically coupled by means of coupling 11 to a motor 12 which is a DC motor. The DC motor is connected through a switch 14 to a battery 15. A disc 17 is connected via a further mechanical connection 16 to prism 10. The beam travelling along path 8 impinges upon a rotatable mirror 18 in synchronism with the rotational speed of prism 10. Mirror 8 is a semitranslucent mirror which causes a first pulsed light beam travelling along a path 19 to be applied to first photoelectric transducer means including a diaphragm 20 and a photoelectric element 65 positioned directly behind diaphragm 20 and a second pulsed light beam travelling along path 21 to travel through a diaphragm 22 onto a photoelectric transducer 23 positioned immediately behind diaphragm 22.

Diaphragms 20 and 22 are positioned relative to the plane of objective 1 in such a manner that the distance between diaphragm 22 is smaller and that between diaphragm 20 and the objective plane is greater by a predetermined distance increment than is the distance between film plane 9 and the plane of objective 1. The distances herein referred to are of course distances along the path of propagation of light. Thus, relative to film plane 9, diaphragms 20 and 25 are positioned, optically speaking, before and behind film plane 9. A photoelement 23 is positioned behind diaphragm 22 and is connected via a resistor 24 with the inverting input of an operational amplifier 25. The output of operational amplifier 25 is connected via a photoresistor 26, which is mounted in such a manner that the light falling thereon corresponds to the ambient light, with the inverting input of said operational amplifier. Operational amplifier 25 and photoresistor 26 constitute first operational amplifier means and together constitute a variable gain amplifier. Further, the output of operational amplifier 25 is connected via a differentiating capacitor 27 with the inverting input of an operational amplifier 28. Operational amplifier 28, in conjunction with capacitor 27 and a resistor 29 connected from the output of operational amplifier 28 to its inverting input constitute differentiating circuit means. The output of operational amplifier 28 is connected to a rectifier 30 whose cathode is connected to a capacitor 32, a preferred embodiment of first storage means. The cathode of rectifier 30 is also connected to the direct input of an operational amplifier 31. A transistor 33 has an emitter-collector circuit connected in parallel with capacitor 32. The inverting input of operational amplifier 31 is connected via a resistor 34 to its input. The gain of amplifier 31 is determined by the ratio of resistor 34 to resistor 35 which, together with resistor 34 constitutes a voltage divider. The output of operational amplifier 31 is connected to the inverting input of an operational amplifier 4 which constitutes comparator means. The output of the comparator means of course constitutes the control signal.

Similarly, a photoelement 65 is connected behind diaphragm 20. Photoelement 65 is connected through a variable resistor 36 to the inverting input of an operational amplifier 37 which corresponds to amplifier 25 mentioned above. A photoresistor 38 corresponding to the abovementioned photoresistor 28 is connected from the output to the inverting input of operational amplifier 37. A differentiating capacitor 39, corresponding to differentiating capacitor 27, is connected to the inverting input of an operational amplifier 40, which of course corresponds to operational amplifier 28. Feedback resistor 41 corresponds to a feedback resistor 29 mentioned above. The output of differential amplifier 40 is connected through a rectifier 42 to second storage means, namely a capacitor 43. Connected in parallel with capacitor 43 is the emitter-collector circuit of a transistor 44 whose base receives the signal herein referred to as the discharge signal. The base of transistor 44 is connected in common with the base of transistor 33. Further, the cathode of rectifier 42 is connected to the direct input of an amplifier 45 which corresponds to amplifier 31 mentioned above. The output of differential amplifier 45 is connected to the direct input of differential amplifier 4. The control signal, namely the output of differential amplifier 4, is of course proportional to the difference between the signals applied at its two inputs. The discharge signal applied to the base of transistors 33 and 44 is supplied by a pulse switching circuit 48. Pulse switching circuit 48 receives an input from a contact 49 which is a mechanical contact driven by a cam 17. Cam 17 is mechanically coupled to prism 10 and thus to the rotating means, namely motor 12. Transistors 33 and 44 are switched to the conductive state during effective an angle of rotation of prism 10 which is substantially smaller than the angle defined by edges 10a and 10b of prism 10.

The above circuit operates as follows:

First, let it be assumed that objective 1 is positioned in such a manner that an object, namely a high contrast object, is pictured sharply in the plane of diaphragm 22, while its image in the plane of diaphragm 20 is not sharp. While prism 10 turns in the direction of arrow B, the image of the object, namely a high contrast object, is formed in a pulsating manner in the planes of diaphragms 20 and 22. The pulse repetition frequency is of course determined by the rotational frequency of motor 12. Since, for the assumed conditions, diaphragm 22 is in the focal plane 22 of objective 1, photoelement 23 receives a light pulse which has a very short rise time. After application in operational amplifier 25, whose gain depends upon the intensity of illumination of the surroundings, and after differentiation in the differentiating circuit means including differential amplifier 28, the resulting signal is stored in capacitor 32, a preferred embodiment of first storage means. Thus a corresponding DC voltage is furnished at the input of differential amplifier 4.

Since diaphragm 20 is outside of the focal plane of objective 1, the light pulse falling onto photoelement 65 has a longer rise time, that is a lesser slope. Thus the differentiated voltage stored in capacitor 43 has a lesser amplitude. Because of the difference in amplitude at the inputs of differential amplifier 4, its output circuit is completely conductive. It should be mentioned here that the output stage of differential amplifier 4 is actually a threshold circuit so that, depending upon the signals applied at its two inputs, its output furnishes either a voltage corresponding to the positive terminal of battery 5 or the negative terminal of battery 6. Thus motor 12 rotates in either the clockwise or the counter-clockwise direction. The objective 1 is thus driven either towards the first or the second extreme position. Of course if objective 1 is correctly positioned, the voltages at the inverting and direct inputs of amplifier 4 will be the same so that no signal is furnished to motor 3 and this motor stands still.

It should be noted that the direct inputs of operational amplifiers 31 and 45 have very high and equal input impedances so that the discharge of capacitors 32 and 43 takes place with the same time constant.

Also shown in FIG. 1 is a switch 49 operated by cam 17. It should be noted that switch 49 is closed for each light pulse falling onto photoelements 23 and 65. A switching circuit 48 is connected to switch 49. Switching circuit 48 causes transistors 33 and 44 to be conductive for a very short time interval immediately following each pulse received by photoelements 23 and 65. Thus capacitors 32 and 43 can discharge prior to the receipt of the subsequent pulse. The motion of objective 1 is thus controlled by each sequential light pulse received by photoelements 23 and 65. In a preferred embodiment of the present invention electronic circuit switch 48 is a circuit which includes an output transistor which is non-conductive, causing the output of stage 48 to be a high voltage output when switch 49 is open and which connects the bases of transistors 33 and 44 to ground potential when switch 49 is closed.

Figure 2:
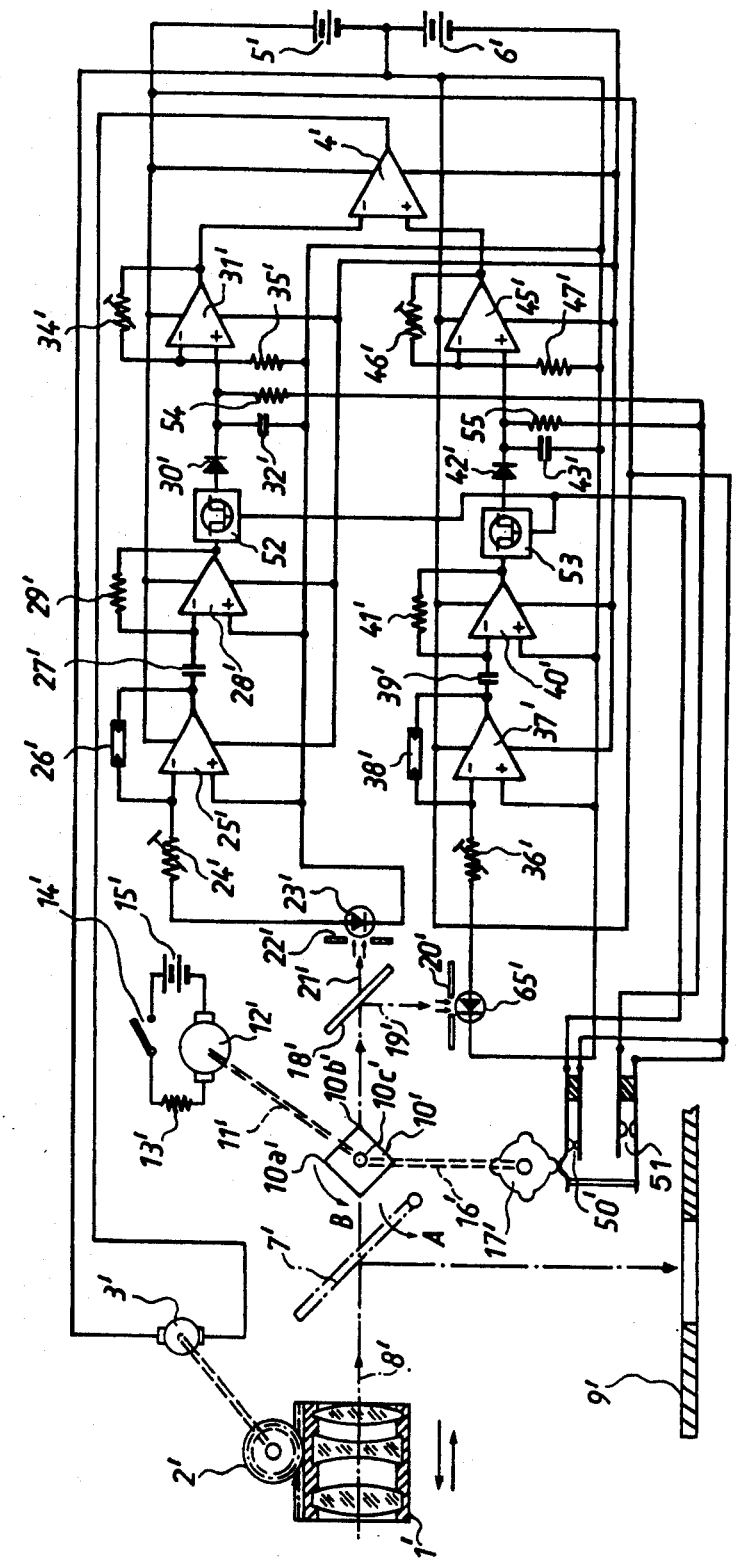
FIG. 2 is a second embodiment of the present invention.

In the second preferred embodiment of the present invention shown in FIG. 2, elements having the same function as shown in FIG. 1 have the same reference numerals, except that it is followed by a prime. Electronic switches 52 and 53 which constitute a preferred embodiment of disconnect means are interconnected between the outputs of differential amplifier 28' and capacitor 32' and between the output of differential amplifier 40 and capacitor 43'. A cam 17' drives a switch 50' and a switch 51. One terminal of switch 51 is connected to the common point of batteries 5' and 6', while the other terminal is connected to one terminal each of a resistor 54 and 55. The other terminal of resistor 54 is connected to the cathode of rectifier 30', while the other terminal of resistor 55 is connected to the cathode of rectifier 42'. When switch 51 is closed, resistors 54 and 55 are thus, respectively, connected in parallel with capacitors 32' and 43', allowing these capacitors to discharge. One terminal of switch 50' is connected in common to the bases of transistors 52 and 53, while the other terminal is also connected to the common point of batteries 5' and 6'. Switch 50' opens when switch 51 is closed. When switch 50 is closed, transistors 52 and 53 are blocked, so that capacitors 32' and 43', are disconnected from photoelements 23' and 65'. During this time, switch 51 is also closed so that capacitors 32' and 43' can discharge over resistors 54 and 55 respectively. When switches 52 and 53 are closed, pulses are received by the photosensitive elements 23' and 65' and a signal corresponding to the differential leading edge of the two pulses is applied to capacitors 32' and 43' to constitute the stored differential output signals.

It is evident that the present invention constitutes a simple, economical and reliable means for effecting the automatic focussing of the camera, whether motion picture or still camera.

While the invention has been illustrated and described as embodied in using particular types of circuits and moving and rotating means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a photographic camera having film located in a predetermined film plane, an objective for focussing light on said film, and moving means for moving said objective along a predetermined path between a first and second extreme position in response to a control signal, an automatic focussing arrangement, comprising, in combination, optical scanning means mounted for rotation about a fixed axis in said camera and positioned behind said objective for receiving light having passed through said objective and furnishing pulsed light corresponding thereto; rotating means coupled to said optical scanning means, for rotating said optical scanning means about said fixed axis; beam splitting means positioned behind said optical scanning means for receiving said pulsed light and furnishing a first and second pulsed light beam in response thereto; first photoelectric transducing means positioned in the path of said first pulsed light beam at a distance from the plane of said objective equal to the distance between said film plane and said plane of said objective decreased by a predetermined distance increment, for furnishing a first electrical signal in response to said first pulsed light beam; second photoelectric transducing means positioned in the path of said second pulsed light beam at a distance from said plane of said objective equal to said distance from said film plane to said plane of said objective increased by said predetermined distance increment, for furnishing second electrical signals in response to said second pulsed light beam; and circuit means connected to said first and second photoelectric transducing means and said moving means for furnishing said control signal to said moving means in response to said first and second electrical signals, said circuit means comprising a first and second differentiating circuit means connected to said first and second photoelectric transducing means, respectively, for differentiating said first and second electrical signals respectively and furnishing first and second differentiator output signals in response thereto, first and second storage means respectively connected to the output of said first and second differentiating circuit means for furnishing a first and second stored differentiator output signal respectively, discharge means connected to said first and second storage means and driven in synchronism with said rotating means for discharging said first and second storage means at least once during each rotation of said optical scanning means, and comparator means connected to said first and second storage means for comparing said first and second stored differentiator output signal and furnishing said control signal as a function of the difference therebetween.

2. An arrangement as set forth in claim 1, wherein said discharge means comprise a first and second discharge circuit respectively connected in parallel with said first and second storage means, each for discharging the corresponding one of said storage means in response to a discharge signal; wherein said optical scanning means furnishes pulses in said pulsed light beam during predetermined angles of rotation thereof; further comprising discharge signal furnishing means coupled to said rotating means and connected to said first and second discharge circuit, for furnishing said discharge signal to said first and second discharge circuit during angles of rotation of said optical scanning means substantially smaller than said predetermined angles.

3. An arrangement as set forth in claim 2, further comprising first and second disconnect means respectively connected between said first and second differentiating circuit means and said first and second storage means for disconnecting said first and second storge means from said first and second differentiating circuit means in response to a disconnect signal; and means for furnishing said disconnect signal in synchronism with said discharge signal.

4. An arrangement as set forth in claim 2, wherein said first and second storage means comprise, respectively, a first and second capacitor; wherein said first and second discharge circuit means comprise, respectively, a first and second transistor having an emitter-collector circuit connected in parallel with said first and second capacitor respectively and having, respectively, a first and second base; and wherein said discharge signal furnishing means comprise a cam mechanically coupled to said rotating means and a switch positioned in operative proximity to said cam for furnishing said discharge signal during predetermined angles of rotation of said cam.

5. An arrangement as set forth in claim 4, further comprising an electronic switching circuit interconnected between said switch and said first and second base of said first and second transistor for switching said first and second transistor to the conductive state in response to each of said discharge signals.

6. An arrangement as set forth in claim 3, wherein said disconnect means comprise a first and second disconnect transistor having, respectively, a first and second emitter-collector circuit connected between said first and second differentiating circuit and said first and second storage means, said first and second disconnect transistor having, respectively, a first and second base for receiving said disconnect signal; and wherein said means for furnishing said disconnect signal comprise means for furnishing a cutoff signal to said first and second base of said first and second disconnect transistor.

7. An arrangement as set forth in claim 6, wherein said first and second storage means respectively comprise a first and second capacitor; and wherein said first and second discharge circuit respectively comprise a first and second resistor and means for connecting said first and second resistor in parallel with said first and second capacitor in response to said discharge signal.

8. An arrangement as set forth in claim 1, wherein each of said differentiating circuit means comprise an operational amplifier having a first and second input and an output, a capacitor connected to said first input, and a resistor connected between said output and said first input; further comprising a first and second rectifier respectively interconnected between the output of said first and second operational amplifier and said storage means.

9. An arrangement as set forth in claim 1, wherein said optical scanning means comprise a prism.

10. An arrangement as set forth in claim 1, wherein said first and second photoelectric transducing means comprise, respectively, a first and second diaphragm and a first and second photosensitive element respectively positioned immediately behind said first and second diaphragm in the direction of propagation of said first and second pulsed light beam.

11. In a photographic camera having film located in a predetermined film plane, an objective for focussing light on said film, and moving means for moving said objective along a predetermined path between a first and second extreme position in response to a control signal, an automatic focussing arrangement, comprising, in combination, optical scanning means mounted for rotation about a fixed axis in said camera and positioned behind said objective for receiving light having passed through said objective and furnishing pulsed light corresponding thereto; rotating means coupled to said optical scanning means, for rotating said optical scanning means about said fixed axis; beam splitting means positioned behind said optical scanning means for receiving said pulsed light and furnishing a first and second pulsed light beam in response thereto; first photoelectric transducing means positioned in the path of said first pulsed light beam at a distance from the plane of said objective equal to the distance between said film plane and said plane of said objective decreased by a predetermined distance increment, for furnishing a first electrical signal in response to said first pulsed light beam; second photoelectric transducing means positioned in the path of said second pulsed light beam at a distance from said plane of said objective equal to said distance from said film plane to said plane of said objective increased by said predetermined distance increment, for furnishing second electrical signals in response to said second pulsed light beam; circuit means connected to said first and second photoelectric transducing means and said moving means for furnishing said control signal to said moving means in response to said first and second electrical signals, said circuit means comprising a first and second differentiating circuit connected to said first and second photoelectric transducing means, respectively, for differentiating said first and second electrical signals respectively and furnishing first and second differentiator output signals in response thereto, first and second storage means respectively connected to the output of said first and second differentiating circuit means for furnishing a first and second stored differentiator output signal respectively, discharge means connected to said first and second storage means and driven in synchronism with said rotating means for discharging said first and second storage means at least once during each rotation of said optical scanning means, and comparator means connected to said first and second storage means for comparing said first and second stored differentiator output signal and furnishing said control signal as a function of the difference therebetween; and a first and second operational amplifier connected between said first and second photoelectric transducing means and said circuit means, each of said operational amplifiers including means responsive to ambient light conditions for varying the gain thereof in response thereto.

12. In a photographic camera having film located in a predetermined film plane, an objective for focussing light on said film, and moving means for moving said objective along a predetermined path between a first and second extreme position in response to a control signal, an automatic focussing arrangement, comprising, in combination, optical scanning means mounted for rotation about a fixed axis in said camera and positioned behind said objective for receiving light having passed through said objective and furnishing pulsed light corresponding thereto; rotating means coupled to said optical scanning means, for rotating said optical scanning means about said fixed axis; beam splitting means positioned behind said optical scanning means for receiving said pulsed light and furnishing a first and second pulsed light beam in response thereto; first photoelectric transducing means positioned in the path of said first pulsed light beam at a distance from the plane of said objective equal to the distance between said film plane and said plane of said objective decreased by a predetermined distance increment, for furnishing a first electrical signal in response to said first pulsed light beam; second photoelectric transducing means positioned in the path of said second pulsed light beam at a distance from said plane of said objective equal to said distance from said film plane to said plane of said objective increased by said predetermined distance increment, for furnishing second electrical signals in response to said second pulsed light beam; circuit means connected to said first and second photoelectric transducing means and said moving means for furnishing said control signal to said moving means in response to said first and second electrical signals, said circuit means comprising a first and second differentiating circuit connected to said first and second photoelectric transducing means, respectively, for differentiating said first and second electrical signals respectively and furnishing first and second differentiator output signals in response thereto, and comparator means connected to said first and second storage means for comparing said first and second stored diffferentiator output signals and furnishing said control signal as a function of the difference therebetween; further comprising a first and second operational amplifier connected between said first and second photoelectric transducing means and said first and second differentiating circuit means respectively, each of said operational amplifiers including means responsive to ambient light conditions for varying the gain thereof in response thereto.

13. An arrangement as set forth in claim 12, wherein said means responsive to ambient light conditions comprise a first and second photosensitive element mounted to receive ambient light and respectively connected to said first and second operational amplifier in such a manner that the gain of said first and second operational amplifier increases with decreasing ambient light.

* * * * *